United States Patent
Skoryukina et al.

(10) Patent No.: US 12,387,520 B2
(45) Date of Patent: Aug. 12, 2025

(54) REDUCING FALSE DETECTIONS IN TEMPLATE-BASED CLASSIFICATION OF IDENTITY DOCUMENTS

(71) Applicant: Smart Engines Service LLC, Moscow (RU)

(72) Inventors: Natalya Sergeevna Skoryukina, Domodedovo (RU); Vladimir Viktorovich Arlazarov, Moscow (RU)

(73) Assignee: SMART ENGINES SERVICE, LLC (RU)

( * ) Notice: Subject to any disclaimer, the term of this patent is extended or adjusted under 35 U.S.C. 154(b) by 403 days.

(21) Appl. No.: 17/971,133

(22) Filed: Oct. 21, 2022

(65) Prior Publication Data

US 2023/0130990 A1    Apr. 27, 2023

(30) Foreign Application Priority Data

Oct. 22, 2021    (RU) .......................... RU2021130896

(51) Int. Cl.
- *G06V 30/42* (2022.01)
- *G06V 10/44* (2022.01)
- *G06V 10/74* (2022.01)

(52) U.S. Cl.
CPC ............ *G06V 30/42* (2022.01); *G06V 10/443* (2022.01); *G06V 10/761* (2022.01)

(58) Field of Classification Search
CPC .. G06V 10/443; G06V 10/757; G06V 10/751; G06V 10/761; G06V 30/418; G06V 30/42
USPC ........................................................ 382/112
See application file for complete search history.

(56) References Cited

U.S. PATENT DOCUMENTS

2021/0110151 A1* 4/2021 Tagra .................... G06F 40/103

FOREIGN PATENT DOCUMENTS

WO    WO-2007023993 A1 *  3/2007  ............. G06F 16/40

OTHER PUBLICATIONS

Augereau, Olivier, Nicholas Journet, and Jean-Philippe Domenger. "Semi-structured document image matching and recognition." Document Recognition and Retrieval XX. vol. 8658. SPIE, 2013. (Year: 2013).*

Awal, Ahmad Montaser, et al. "Complex document classification and localization application on identity document images." 2017 14th IAPR International Conference on Document Analysis and Recognition (ICDAR). vol. 1. IEEE, 2017. (Year: 2017).*

(Continued)

*Primary Examiner* — Chineyere Wills-Burns
*Assistant Examiner* — Emmanuel Silva-Avina
(74) *Attorney, Agent, or Firm* — HAYES SOLOWAY P.C.

(57) ABSTRACT

Reducing false detections in template-based classification of identity documents. In an embodiment, an iterative procedure is used to generate one or more hypotheses for the location of a document in image data and a type of document in the image data based on a plurality of predefined models representing a plurality of types of documents. The one or more hypotheses are filtered by rejecting any hypothesis that is not well-conditioned according to one or more criteria. When a best hypothesis that satisfies a threshold remains after filtering the one or more hypotheses, the document in the image data is analyzed, and, when no hypothesis that satisfies the threshold remains after filtering the one or more hypotheses, the image data is rejected.

16 Claims, 2 Drawing Sheets

(56) References Cited

OTHER PUBLICATIONS

Skoryukina, Natalya, Vladimir Arlazarov, and Dmitry Nikolaev. "Fast method of ID documents location and type identification for mobile and server application." 2019 International Conference on Document Analysis and Recognition (ICDAR). IEEE, 2019. (Year: 2019).*

Skoryukina, Natalya, et al. "Impact of geometrical restrictions in RANSAC sampling on the ID document classification." Twelfth International Conference on Machine Vision (ICMV 2019). vol. 11433. SPIE, 2020. (Year: 2020).*

* cited by examiner

REDUCING FALSE DETECTIONS IN TEMPLATE-BASED CLASSIFICATION OF IDENTITY DOCUMENTS

CROSS-REFERENCE TO RELATED APPLICATIONS

The present application claims priority to Russian Application No. 2021130896, filed on Oct. 22, 2021, which is hereby incorporated herein by reference in its entirety.

BACKGROUND

Field of the Invention

The embodiments described herein are generally directed to the classification of identity documents, and, more particularly, to reducing false detections in template-based classification of identity documents.

Description of the Related Art

Until recently, remote personal authentication has been provided primarily as a matter of convenience. In the absence of a remote option, services (e.g., goods, tickets, insurance, tax payments or refunds, etc.) could still be acquired offline and in person. However, the COVID-19 pandemic has resulted in safety and security measures that seriously affect the provision of in-person services. As a result of the epidemiological situation, the scope and usage of automatic data entry systems—and, in particular, systems that recognize identity documents—have experienced significant expansion.

For example, existing procedures which involved identity verification (e.g., deliveries of subscriber identification module (SIM) cards, bank cards, prescription medicines, etc.) had to be converted to remote formats. The series of physical document verification steps that were performed in person (e.g., substrate relief features, physical material validation, ultraviolet checks, etc.) can no longer be performed in a remote scenario. Instead, in remote personal authentication, optical checks are used as a substitute for physical document verification.

However, the reliance on optical checks has produced a set of new problems associated with personal data processing. For example, the mass-processing of documents containing personal data (e.g., to detect and account for COVID-19 positive contacts, apply for tests and vaccinations, issue corresponding documents and certifications, etc.) requires maximum execution speed with minimal personnel involvement.

SUMMARY

Systems, methods, and non-transitory computer-readable media are disclosed for reducing false detections in template-based classification of identity documents.

In an embodiment, a method is disclosed that uses at least one hardware processor to: receive image data; use an iterative procedure to generate one or more hypotheses for the location of a document in the image data and a type of document in the image data based on a plurality of predefined models representing a plurality of types of documents; filter the one or more hypotheses by rejecting any hypothesis that is not well-conditioned according to one or more criteria; when a best hypothesis that satisfies a threshold remains after filtering the one or more hypotheses, analyze the document in the image data; and, when no hypothesis that satisfies the threshold remains after filtering the one or more hypotheses, reject the image data. The iterative procedure may comprise a sample consensus algorithm, such as a random sampling and consensus (RANSAC) algorithm.

Each of the one or more hypotheses may comprise one or more inlying feature pairs between the image data and one of the plurality of predefined models, wherein each feature pair comprises a first feature in the image data and a second feature, in the one predefined model, that matches the first feature. The one or more criteria may comprise a criterion that a hypothesis is well-conditioned when a number of the one or more inlying feature pairs is greater than a threshold value. The one or more criteria may comprise a criterion that a hypothesis is well-conditioned when a ratio of semi-axes of a dispersion ellipse is greater than a predefined threshold. The first and second features may comprise keypoints.

Filtering the one or more hypotheses may further comprise rejecting any hypothesis that satisfies one or more geometric criteria. The one or more geometric criteria may comprise a criterion that the image data contains less than a threshold percentage of a total area of a type of document corresponding to the hypothesis being rejected. The one or more geometric criteria may comprise a criterion that the document in the image data has a rate of compression along axes of the document, relative to one of the plurality of predefined models corresponding to the hypothesis being rejected, that is greater than a second threshold. The one or more geometric criteria may comprise a criterion that the document in the image data has a rate of compression along axes of the document, relative to one of the plurality of predefined models corresponding to the hypothesis being rejected, that is greater than a second threshold.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for reducing false detections in template-based classification of identity documents. After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. EXAMPLE PROCESSING DEVICE

Figure 1:
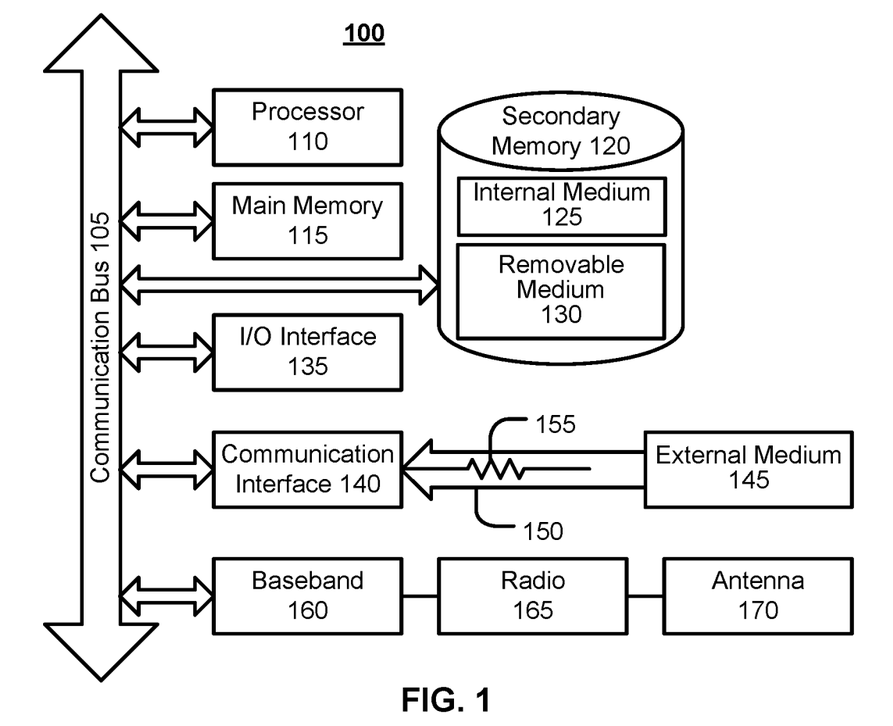
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., one or more software modules of an application implementing the disclosed processes). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., one or more software modules implementing the disclosed processes) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed processes) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown). for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such one or more software modules implementing the disclosed processes) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. PROCESS OVERVIEW

Embodiments of processes for reducing false detections in template-based classification of identity documents will now be described. It should be understood that the described processes may be embodied as an algorithm in one or more software modules, forming an application that is executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Introduction

Figure 2:
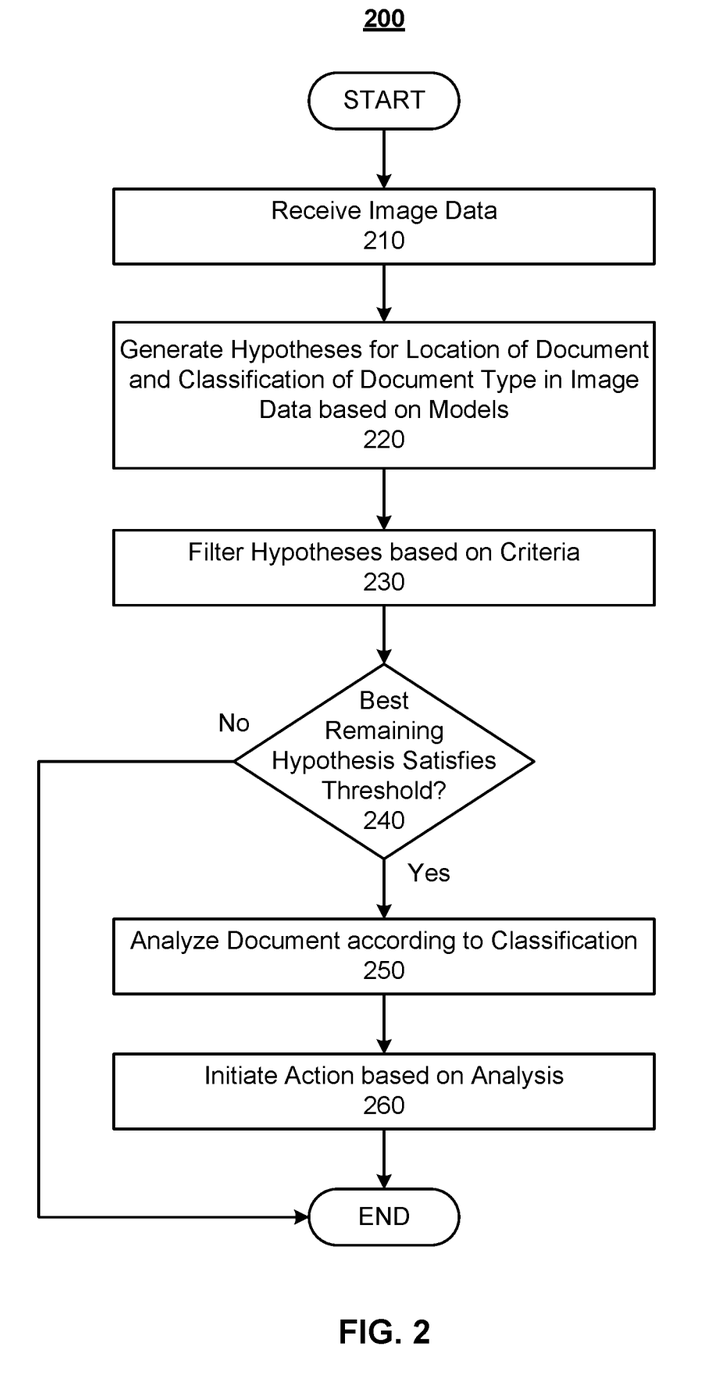
FIG. 2 illustrates an example of automated document processing, according to an embodiment.

FIG. 2 illustrates an example of automated document processing, according to an embodiment. In subprocess 210, input image data is received. In subprocess 220, one or more hypotheses are generated for the location of the document and classification of the document type in the input image data based on template-based models of document types. Subprocess 220 may be configured to detect any variety of types of identity documents, including drivers licenses (e.g., including different drivers licenses for different states), passports (including different passports for different countries), student identification cards (including different cards for different schools), Social Security cards, and/or the like. It should be understood that a plurality of models may be defined, with each of the plurality of models representing a different type of document. In subprocess 230, the one or more hypotheses, generated in subprocess 220, are filtered based on one or more criteria. In particular, one or more of these hypotheses may be rejected or excluded base on the one or more criteria. While subprocess 230 is illustrated as following subprocess 220, it should be understood that subprocess 230 could be performed in parallel with or during subprocess 220 to reject one or more hypotheses as they are generated.

If the best hypothesis, remaining after the filtration of subprocess 230, satisfies a threshold (i.e., "Yes" in subprocess 240), the document may be analyzed according to the document type represented by the best remaining hypotheses in subprocess 250, and an action may be initiated based on this analysis in subprocess 260. A hypothesis may satisfy the threshold if a confidence score, number of inliers, and/or other parameter is greater than (or equal to) a predefined threshold value. In the case that the document is an identity document, the analysis in subprocess 250 may comprise verifying the document's authenticity (e.g., by checking security features), recognizing and extracting personal data from the document, and/or the like. The action in subprocess 260 may comprise any type of action that would normally follow such analysis, such as authentication of a subject's identity following verification of the document's authenticity, usage of the personal data extracted from the document, and/or the like.

If no hypothesis remains after the filtration of subprocess 230 or if the best remaining hypothesis does not satisfy the threshold (i.e., "No" in subprocess 240), process 200 may end without the processing of subprocesses 250 and 260. It should be understood that, in this case, the input image data may be rejected. Optionally, some action may be performed based on the rejection (e.g., sending a notification that the input image data was rejected to the sender of the input image data).

Subprocess 220 enables the following goals to be simultaneously achieved: avoiding unnecessary computation (e.g., once the document is classified, especially in the case of an identity document, text, photographs, and other features can be segmented, and background can be excluded); increasing recognition accuracy (e.g., by compensating for projective distortions); and detecting non-authentic documents. See, e.g., Bulatov et al., "Smart IDReader: Document recognition in video stream," 2017 14th Int'l Association of Pattern Recognition (IAPR) Int'l Conference on Document Analysis and Recognition (ICDAR), IEEE (November 2017), doi:10.1109/ICDAR.2017.347; and Ghanmi et al., "A new descriptor for pattern matching: Application to identity document verification," 2018 14th IAPR Int'l Workshop on Document Analysis Systems (DAS), pp. 375-80 (2018), doi:10.1109/DAS.2018.74; which are both hereby incorporated herein by reference as if set forth in full.

Specifics of the document location and classification problem for identity documents are discussed in detail in Sicre et al., "Identity documents classification as an image classification problem," Image Analysis and Processing, Int'l Conference on Image Analysis and Processing (ICIAP) 2017, pp. 602-13 (2017), Awal et al., "Complex document classification and localization application on identity document images," 2017 14th IAPR ICDAR, IEEE (November 2017), doi:10.1109/ICDAR.2017.77, and Skoryukina et al., "Fast method of ID documents location and type identification for mobile and server application," 2019 ICDAR, IEEE (September 2019), doi:10.1109/ICDAR.2019.00141, which are all hereby incorporated herein by reference as if set forth in full. The main difficulties in document location and classification are related to the large number of classes, the scarcity of training data, the quality of input image data, and speed requirements.

Input image data that are captured using the camera of a mobile device typically comprise images or image frames of a video captured in weakly controlled conditions. From the perspective of regular users, the use of mobile devices is convenient due to the wide availability of smart phones, the speed of capturing images using such devices, and the ability to demonstrate security features using a video stream. From the perspective of users who are responsible for verifying identity documents (e.g., police officers, healthcare workers, etc.), the use of mobile devices, as mobile points of service, is convenient, relatively inexpensive, and enables the user to maintain a safe distance during image capture of the document.

In practice, errors of various kinds will occur during document processing, regardless of the method that is used. However, in a pandemic, the cost of an error increases. For example, when the document processing is being used to account for COVID-19 positive contacts, each error may result in an untracked contagion event. Thus, invalid results should be detected, when possible, and either excluded from the output or, at the very least, marked as questionable or unusable. In a client-side case in which a video stream is being processed by a user device, extra effort, time, and energy may be saved by skipping an image frame of the video stream that produces a potentially erroneous result, since the next captured image frame may have a higher quality. In addition, excluding potentially erroneous results may reduce the noise during combination of per-frame results, thereby increasing the accuracy of the final result. In a server-side case, excluding potentially erroneous results can prevent attacks and reduce response times, regardless of the structure of the input image data.

The preliminary rejection of bad-quality input image data increases accuracy, even for individual images. If multiple hypotheses are evaluated, the selection or filtration of incorrect or questionable hypotheses may correct ranging defects in the hypotheses. Filtration of hypotheses could happen subsequent to subprocesses 220 and 230, such as during zone segmentation, optical character recognition (OCR), authenticity verification, and the like. However, the earlier the result is rejected, the fewer the resources (e.g., processing time, memory, energy, etc.) that are consumed. Along with its practical significance and efficiency, performing filtration in subprocess 230, following or during subprocess 220, complies with the principles of green artificial intelligence (AI). See, e.g., Schwartz et al., "Green AI," Communications of the Association for Computing Machinery (ACM) 63(12), pp. 54-63 (November 2020), doi:10.1145/3381831, which is hereby incorporated herein by reference as if set forth in full. Thus, disclosed embodiments filter potentially erroneous results at the document location and classification stage in subprocess 230. Particular implementations of the disclosed embodiments achieved state-of-the-art results when tested on document location and classification processes that match input images to a set of predefined models (e.g., constructed from ideal document templates).

The practical advantages of methods that utilize template-based matching for document location have been previously demonstrated. In the case of documents that contain personal data, it is not practical to construct effective deep-neural-network-(DNN)-based end-to-end solutions, since such solutions require large, representative training datasets. Methods of independent content-unaware location work well under two conditions: (i) the aspect ratio of the document is not known, but document boundaries or corners are clearly visible in the input image data and the background is uniform; or (ii) the aspect ratio of the document is known and at least three out of four document edges are clearly visible in the input image data. In all other cases, the document cannot be unambiguously located without taking the content of the document into account. This prohibits or restricts the application of these methods in scenarios in which the document boundaries may lie outside the frame of the input image data.

The results of a preliminary document location are often used before classification of the document type, for example, to rectify the input image data. Rectification of the input image data allows the utilization of methods that are not robust against projective distortions. An example of such a method is a histogram of oriented gradients (HOG) classifier. See, e.g., Simon et al., "Fine-grained classification of identity document types with only one example," 2015 14th IAPR Int'l Conference on Machine Vision Applications (MVA), pp. 126-9, IEEE (2015), which is hereby incorporated herein by reference as if set forth in full. Thus, errors in the document location process can negatively affect the precision of the classification process.

The state-of-the-art method for document location and classification in subprocess 220 utilizes predefined models for each type of document. See, e.g., Awal et al., and Skoryukina et al. Each model is represented as a set of local features. Methods, such as scale-invariant feature transform (SIFT) and speeded up robust features (SURF), utilize keypoints and metric descriptors of the local neighborhoods of the local features. Only one sample of an ideal document template is required to construct a model. During runtime, the same features are extracted from input image data, and, for each extracted feature, the nearest metric neighbors are found among the stored models. The potential document types, or hypotheses, are then arranged according to a number of "closest" model descriptors. For the best N models, a transformation matrix H is estimated to define a correspondence between the keypoints of a stored model and those in the input image data. Transformation matrix H may be estimated using an algorithm from the sample consensus family, such as random sampling and consensus (RANSAC), M-estimator sampling and consensus (MSAC), and the like. See, e.g., Raguram et al., "A comparative analysis of RANSAC techniques leading to adaptive real-time random sample consensus," European Conference on Computer Vision, pp. 500-13, Springer (2008); and Raguram et al., "USAC: A universal framework for random sample consensus," IEEE Transactions on Pattern Analysis and Machine Intelligence 35(8), 2022-38 (August 2013), doi:10.1109/TPAMI.2012.257; which are both hereby incorporated herein by reference as if set forth in full. The representations, input to the algorithm, of all matchings of the input image data to models may be constructed from the pairs of keypoints with "close" descriptors (e.g., as defined by a distance parameter).

There is much room for improvement in this method. In contrast with end-to-end solutions, the advancements of machine-learning techniques in producing metric descriptors enables the acquisition of smaller and more robust features. See, e.g., Suárez et al., "BEBLID: Boosted efficient binary local image descriptor," Pattern Recognition Letters 133, pp. 366-72 (May 2020), doi:10.1016/J.PATREC.2020.04.055, which is hereby incorporated herein by reference as if set forth in full. The sources of hypotheses can comprise not only keypoints, but also edges, text components, machine-readable zones, and photographs. See, e.g., Shemiakina et al., "Fast projective image rectification for planar objects with Manhattan structure," Int'l Conference on Machine Vision (ICMV) 2019, vol. 11433, pp. 1-9, Society of Photo-optical Instrumentation Engineers (SPIE) (January 2020), doi:10.1117/12.2559630; Kolmakov et al., "Machine-readable zones detection in images captured by mobile devices' cameras," Pattern Recognition and Image Analysis 30(3), 489-95 (2020); and Wu et al., "Identity authentication on mobile devices using face verification and ID image recognition," Procedia Computer Science 162, 932-39 (2019); which are all hereby incorporated herein by reference as if set forth in full. The combination of different features enables the formulation of different types of hypotheses and utilizes cheaper schemes for the transformation matrix estimation. See, e.g., Chiron et al., "ID documents matching and localization with multi-hypothesis constraints," 2021 25th Int'l Conference of Pattern Recognition (ICPR) (2021), which is hereby incorporated herein by reference as if set forth in full; and Skoryukina et al. While filtering false detections is significant for many areas and applications of computer vision, its effects have been underrepresented in published works related to document analysis and recognition.

In Augereau et al., "Semi-structured document image matching and recognition," Document Recognition and Retrieval XX, vol. 8658, p. 865804, Int'l Society for Optics and Photonics (2013), doi:10.1117/12.2003911, which is hereby incorporated herein by reference as if set forth in full, it was assumed that the document is present in the input image data if the number of inliers of the best hypothesis is higher than a predefined threshold. In Awal et al., the rejection of hypotheses is based on geometric criteria. The input image is classified as an unknown type if the quadrangle of the found document is degenerate, nonconvex, or deviates significantly from a rectangle. In Skoryukina et al. (2019) and Skoryukina et al., "Impact of geometrical restrictions in RANSAC sampling on the ID document classification," ICMV 2019, vol. 11433, pp. 1-7, SPIE (January 2020), doi:10.1117/12.2559306, which is hereby incorporated herein by reference as if set forth in full, a similar approach is used with hypothesis rejection based on the number of inliers and with geometric checks moved to a level of an iterative scheme.

These methods can complement each other, to allow for a significant increase in speed and classification precision. In the case of strong geometric restrictions, the number of classification errors can be reduced to almost zero. However, almost all existing analysis has been performed on a positive data selection: the test images contain some document, and, for each evaluated document type, the model is preliminarily defined. In practice, these conditions do not hold. Therefore, the disclosed embodiments have been developed as a more robust method for rejecting hypotheses.

2.2. Goal

In a general document-type classification problem, in which the number of document types is known in advance and a model is defined for each type of document, the output is one of N+1 classes, where N is the number of models. Images which cannot be classified into any of the known types, are classified into a null class, representing "garbage" images that are unsuitable for further analysis.

Garbage images can be the result of a number of factors, including purposeless or unintentional uploading of images by users of the service, an intentional attack on the service, defects in the capture device, and defects in the capture conditions or procedure. Notably, a document with a known type may be classified as "garbage" if some required data cannot be extracted from it. Such situations may occur if a significant part of the document lies outside the frame represented by the image data, and/or the size of the document representation is too small.

Standard classification precision metrics may value the cost of all types of classification errors the same. However, in practice, misclassifying a document type X as document type Y and misclassifying garbage as a document type are typically costlier than misclassifying a document as garbage. Thus, one goal of disclosed embodiments is to reduce the number of costly errors by converting more critical errors to less critical errors.

2.3. Approach

In an embodiment, two or more filtration criteria are united to correct classification errors. These filtration criteria correspond to the criteria used in subprocess 230. The parameters of the criteria may be defined according to the input image data (e.g., documents can be well distinguished within a wide range of rotation angles). The construction of the document models, feature matching, model ranging, and the generation and selection of hypotheses are described in detail in Schwartz et al. and Skoryukina et al. (2019). To build models and initial candidates (e.g., before the application of RANSAC), a SURF-based method may be used, as described in Awal et al.

The rejection criterion proposed in Awal et al. strongly restricts the output quadrangle. Along with rejecting incorrect hypotheses, this rejection criterion rejects legitimate cases of input image data with a rotated document quadrangle. In order to avoid such cases, in an embodiment, estimation of the transformation matrix H and the checking of rejection conditions is performed with one or more, including potentially all, of the following conditions:

(1) An iterative procedure is used. Examples of iterative procedures include sampling and consensus methods, such as RANSAC, MSAC, and USAC. The set of constraints for sampling keypoint pairs or other features and generating hypotheses may be adopted from Skoryukina et al. (2020), including:
  (a) The distances d between sampled keypoints should be greater than or equal to a minimum distance min_dist;
  (b) The deviation of sampled keypoints, defined as $|1-D/\overline{D}|$, is less than or equal to a maximum value $D_{max}$, where $$D = \frac{d_{template}}{d_{source}},$$

in which $d_{template}$ is the distance d between the sampled keypoints that were calculated in the template and $d_{source}$ is the distance d between the sampled keypoints that were calculated in the input image data (i.e., source), and $\overline{D}$ is the average of D; and
  (c) The transformation matrix H is convex.

(2) The hypothesis is well-conditioned. The structure and number of keypoint pairs that are considered as inliers characterize the confidence of the class selection and determine whether the transformation matrix H will be well-conditioned. In an embodiment, a hypothesis will be well-conditioned if, and only if, the number of inliers is greater than (or equal to) N, and the endpoints of the inlier pairs cover a significant portion of the document model. To estimate the coverage of the model by the endpoints of the inlier pairs, two keypoint clouds can be considered: all keypoints in the model; and the keypoints in the model that belong to inlier pairs. Specifically, the parameters of a keypoints dispersion ellipse can be calculated for each of the two keypoint clouds. Each dispersion ellipse is an ellipse that circumscribes the respective keypoint cloud. The dispersion ellipse characterizes an effective area of the model, which is defined by local features, and the density of the keypoint cloud within that area. In an embodiment, two dispersion ellipses are used. The first dispersion ellipse $E_t$ circumscribes all keypoints in the template, with its semi-major and semi-minor axes denoted as $R_{E_t}$ and $r_{E_t}$, respectively. The second dispersion ellipse $E_s$ circumscribes the keypoints in the template which belong to inlier pairs, with its semi-major and semi-minor axes denoted as $R_{E_s}$ and $r_{E_s}$, respectively. The diameters of the dispersion ellipse may be calculated as the square roots of the inertia tensor eigenvalues of the considered point cloud:

$$V_{eigen} = 0.5 * (A_x + A_y) \pm d$$

wherein

-continued $$A_{xx} = \frac{1}{n}\sum_{i=0}^{n} x_i^2 - \left(\frac{1}{n}\sum_{i=0}^{n} x_i\right)^2$$

$$A_{yy} = \frac{1}{n}\sum_{i=0}^{n} y_i^2 - \left(\frac{1}{n}\sum_{i=0}^{n} y_i\right)^2$$

$$A_{xy} = \frac{1}{n}\sum_{i=0}^{n} x_i y_i - \frac{1}{n^2}\sum_{i=0}^{n} x_i \sum_{i=0}^{n} y_i$$

$$d = \sqrt{0.25*(A_x + A_y)^2 + (A_{xy})^2 - A_x A_y}$$

wherein $V_{eigen}$ is a pair of eigenvalues of the inertia tensor, $x_i$ and $y_i$ are the coordinates (x, y) of the i-th keypoint, $A_x$ is the moment of inertia along the X axis, $A_y$ is the moment of inertia along the Y axis, $A_{xy}$ is the product of inertia, n is the number of keypoints, and d is the stretch factor or magnification ratio. The solution is considered well-conditioned if the ratio $R_{E_s}/R_{E_l}$ between semi-minor axes of the two ellipses is greater than (or equal to) a predefined threshold. The criteria for well-conditioned-ness are applied after the iterative procedure, in order to score the final hypotheses output from the iterative procedure. This sequence is predicated by the following reasons: (1) the computation of the eigenvalues might be a computationally expensive procedure, such that the evaluation of all hypotheses for well-conditioned-ness may slow the overall document processing pipeline; and (2) some RANSAC modifications perform further optimization of transformation matrix H using all inliers, and a preliminary rejection of a hypothesis by a number of inliers increases the recall of the overall result in such cases.

(3) The hypothesis is geometrically correct. The overall result must allow subsequent document analysis. To that end, all of the parts of the document which contain data (e.g., text, personal photograph, holographic security elements, etc.) must be visible within the frame of the image data, and the quality of the image data needs to allow for the interpretation of all of these parts. In an embodiment, to comply with these requirements, the following hypotheses are rejected during document location:
  (a) The frame of the input image data contains less than X % of the total area of the document (e.g., X=70); and/or
  (b) The rate of compression along the document axes, relative to the ideal template, is greater than Y (e.g., Y=4). The rate of compression is the ratio between the original linear size of the template and the linear size of the quadrangle found in the input image data. In particular, given a rectangular template with a width and a height, the transformation matrix H generates a resulting quadrangle Q with coordinates $\{(x_0,y_0), \ldots (x_3,y_3)\}$. As an example, the hypothesis is rejected if $|(x_0,y_0)-(x_1,y_1)|<0.25*\text{width}$ or $|(x_0,y_0)-(x_3,y_3)|<0.25*\text{height}$.

3. EXPERIMENTAL RESULTS

An experiment using particular implementations of disclosed embodiments will now be described. For positive selection of images with identity documents (i.e., images with classifiable documents), the Mobile Identity Document Video 500 (MIDV-500) dataset was used. The MIDV-500 dataset contains samples of fifty document types. For each image, the dataset provides a source image and three-hundred video frames. For negative selection of images (i.e., images with no documents or unclassifiable documents), the eBDtheque dataset was used. The eBDtheque dataset contains one-hundred comic book images. It was selected because comic books contain text blocks, tabular and linear structures, and complicated backgrounds, which are features that may result in spontaneous collisions with identity documents.

The experiment was conducted using three stages:
  (1) Models were constructed for all fifty document types in the MIDV-500 dataset, and video frames of the MIDV-500 dataset were used as inputs.
  (2) Models were constructed for twenty-five document types in the MIDV-500 dataset, and video frames of the MIDV-500 dataset that were not used to construct the models were used as inputs.
  (3) Models were constructed for all fifty document types in the MIDV-500 dataset, but only images from the eBDtheque dataset were used as inputs.

The methods, evaluated in the experiment, were implemented using the OpenCV 4.2.0 package for Arch Linux 5.4.8, and using RANSAC as the iterative procedure. The results were obtained with the following parameters:
  (a) A maximum of 8,000 RANSAC iterations, with an inlier distance threshold of 8, min_dist=10px, and $D_{max}$=0.2. A pair of points ($p_t$, $p_s$), in which $p_t$ is a point in the template and $p_s$ is a point in the input image data (i.e., source), is an inlier for the source-to-template transformation H if $|H^*p_s-p_t|$ is less than the inlier distance threshold.
  (b) For the well-conditioned criteria, the threshold number of inliers N was 8, and the minimum ratio of ellipse semi-axes was 0.2.
  (c) For the geometric criteria, the threshold area X=70%, and the maximum compression rate Y=4.

The tables below depict the classification error rate (i.e., detection of the wrong document type) for each method and stage and the classification accuracy of each method:

| | Classification Error Rate | | |
|---|---|---|---|
| | Dataset | | |
| Type | MIDV-500 (50 types) (positive) | MIDV-500 (25 types) (negative) | eBDtheque (50 types) (negative) |
| (0) no rejection | 4.10% | 51.70% | 46% |
| (1) iterative scheme | 0.19% | 15.50% | 44% |
| (2) ellipse coverage + (1) | 0.00% | 0.12% | 0% |
| (3) number of inliers + (1) | 0.00% | 0.09% | 0% |
| (4) geometric criterion + (1) | 0.10% | 0.50% | 7% |
| All: (1) + (2) + (3) + (4) | 0.00% | 0.00% | 0% |

| | Classification Accuracy for MIDV-500 |
|---|---|
| (0) no rejection | 91.40% |
| (1) iterative scheme | 92.00% |
| (2) ellipse coverage + (1) | 88.86% |
| (3) number of inliers + (1) | 88.27% |
| (4) geometric criterion + (1) | 88.14% |
| All: (1) + (2) + (3) + (4) | 88.14% |

As demonstrated by the first table above, the number of classification errors changed depending on the criteria that were used. The iterative scheme restrictions of method (1) did not significantly influence the results on the eBDtheque dataset, but dramatically reduced the number of errors on the MIDV-500 dataset for all methods. This can be explained by the fact that the comic book images in the eBDtheque dataset contain a lot of features dispersed throughout the images. The addition of the requirement for being well-conditioned in method (2) (using ratio of ellipse semi-axes) and method (3) (using a threshold number of inliers) further decreased the number of false detections to near zero. The addition of the geometric criteria in method (4) also significantly decreased false detections, relative to method (1).

The second table above demonstrates the dependence of the solution recall on the utilized criteria. Restrictions, as demonstrated in Skoryukina et al. (2020), increase the number of correctly determined types. The application of other criteria decreases the recall. However, this effect was not negative. Upon examination, it was clear that, in the rejected images, the documents lie significantly outside the frame of the input image data. In the case of document models with very small numbers of descriptive features, a loss of a small fraction of the document area can make document classification impossible.

4. EXAMPLE EMBODIMENT

The disclosed embodiments address a novel problem that occurs in real document analysis and recognition processes, particularly with respect to identity documents: the presentation of an input image, which does not contain an identity document or any document, to the widely used template-matching approach for document location and classification. In an embodiment, false detections on a negative sample are minimized using criteria that require the solution to be well-conditioned and/or the document quadrangle to be geometrically correct.

Experimentation demonstrated that the criteria led to the complete reduction of the number of false detections on benchmark datasets. The reduction to detection precision amounted to approximately 4%. However, error analysis showed that all of the rejected images from the positive samples (i.e., wrongly rejected input images) were of low capture quality and hardly usable for subsequent document recognition or any other meaningful analysis. Thus, the disclosed embodiments significantly improved the base method and increased its robustness against noisy queries. This is especially important for cases in which there is a risk of attacks to the document recognition service with the intention of overloading the service.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    receive image data;
    use an iterative procedure to generate one or more hypotheses for a location of a document in the image data and a type of document in the image data based on a plurality of predefined models representing a plurality of types of documents, wherein each of the one or more hypotheses comprises one or more inlying feature pairs between the image data and one of the plurality of predefined models, and wherein each feature pair comprises a first feature in the image data and a second feature, in the one predefined model, that matches the first feature;
    filter the one or more hypotheses by rejecting any hypothesis that is not well-conditioned according to one or more criteria, wherein the one or more criteria comprise a criterion that a hypothesis is well-conditioned when a ratio of semi-axes of a dispersion ellipse is greater than a predefined threshold;
    when a best hypothesis that satisfies a threshold remains after filtering the one or more hypotheses, analyze the document in the image data; and,
    when no hypothesis that satisfies the threshold remains after filtering the one or more hypotheses, reject the image data.

2. The method of claim 1, wherein the iterative procedure comprises a sample consensus algorithm.

3. The method of claim 2, wherein the sample consensus algorithm comprises a random sampling and consensus (RANSAC) algorithm.

4. A method comprising using at least one hardware processor to:
    receive image data:
    use an iterative procedure to generate one or more hypotheses for a location of a document in the image data and a type of document in the image data based on a plurality of predefined models representing a plurality of types of documents;
    filter the one or more hypotheses by rejecting any hypothesis that is not well-conditioned according to one or more criteria, wherein filtering the one or more hypotheses further comprises rejecting any hypothesis that satisfies one or more geometric criteria, wherein the one or more geometric criteria comprise a criterion that the document in the image data has a rate of compression along axes of the document, relative to one of the plurality of predefined models corresponding to the hypothesis being rejected, that is greater than a first threshold;
    when a best hypothesis that satisfies a second threshold remains after filtering the one or more hypotheses, analyze the document in the image data; and,
    when no hypothesis that satisfies the second threshold remains after filtering the one or more hypotheses, reject the image data.

5. The method of claim 4, wherein each of the one or more hypotheses comprises one or more inlying feature pairs between the image data and one of the plurality of predefined models, and wherein each feature pair comprises a first feature in the image data and a second feature, in the one predefined model, that matches the first feature.

6. The method of claim 5, wherein the one or more criteria comprise a criterion that a hypothesis is well-conditioned when a number of the one or more inlying feature pairs is greater than a threshold value.

7. The method of claim 6, wherein the one or more criteria comprise a criterion that a hypothesis is well-conditioned when a ratio of semi-axes of a dispersion ellipse is greater than a predefined threshold.

8. The method of claim 5, wherein the one or more criteria comprise a criterion that a hypothesis is well-conditioned when a ratio of semi-axes of a dispersion ellipse is greater than a predefined threshold.

9. The method of claim 5, wherein the first and second features comprise keypoints.

10. The method of claim 4, wherein the one or more geometric criteria comprise a criterion that the image data contains less than a threshold percentage of a total area of a type of document corresponding to the hypothesis being rejected.

11. A system comprising:
at least one hardware processor; and
one or more software modules that are configured to, when executed by the at least one hardware processor,
receive image data,
use an iterative procedure to generate one or more hypotheses for a location of a document in the image data and a type of document in the image data based on a plurality of predefined models representing a plurality of types of documents, wherein each of the one or more hypotheses comprises one or more inlying feature pairs between the image data and one of the plurality of predefined models, and wherein each feature pair comprises a first feature in the image data and a second feature, in the one predefined model, that matches the first feature,
filter the one or more hypotheses by rejecting any hypothesis that is not well-conditioned according to one or more criteria, wherein the one or more criteria comprise a criterion that a hypothesis is well-conditioned when a ratio of semi-axes of a dispersion ellipse is greater than a predefined threshold,
when a best hypothesis that satisfies a threshold remains after filtering the one or more hypotheses, analyze the document in the image data, and,
when no hypothesis that satisfies the threshold remains after filtering the one or more hypotheses, reject the image data.

12. The system of claim 11, wherein the iterative procedure comprises a random sampling and consensus (RANSAC) algorithm.

13. The system of claim 11, wherein the one or more criteria comprise a criterion that a hypothesis is well-conditioned when a number of the one or more inlying feature pairs is greater than a threshold value.

14. The system of claim 11, wherein filtering the one or more hypotheses further comprises rejecting any hypothesis that satisfies one or more geometric criteria.

15. The system of claim 14, wherein the one or more geometric criteria comprise one or both of:
a criterion that the image data contains less than a threshold percentage of a total area of a type of document corresponding to the hypothesis being rejected; or
a criterion that the document in the image data has a rate of compression along axes of the document, relative to one of the plurality of predefined models corresponding to the hypothesis being rejected, that is greater than a second threshold.

16. A non-transitory computer-readable medium having instructions stored thereon, wherein the instructions, when executed by a processor, cause the processor to:
receive image data;
use an iterative procedure to generate one or more hypotheses for a location of a document in the image data and a type of document in the image data based on a plurality of predefined models representing a plurality of types of documents, wherein each of the one or more hypotheses comprises one or more inlying feature pairs between the image data and one of the plurality of predefined models, and wherein each feature pair comprises a first feature in the image data and a second feature, in the one predefined model, that matches the first feature;
filter the one or more hypotheses by rejecting any hypothesis that is not well-conditioned according to one or more criteria, wherein the one or more criteria comprise a criterion that a hypothesis is well-conditioned when a ratio of semi-axes of a dispersion ellipse is greater than a predefined threshold;
when a best hypothesis that satisfies a threshold remains after filtering the one or more hypotheses, analyze the document in the image data; and,
when no hypothesis that satisfies the threshold remains after filtering the one or more hypotheses, reject the image data.

* * * * *